United States Patent [19]

Lanier et al.

[11] Patent Number: 4,468,734
[45] Date of Patent: Aug. 28, 1984

[54] METHOD OF PURGING ERRONEOUS SIGNALS FROM CLOSED RING DATA COMMUNICATION NETWORKS CAPABLE OF REPEATEDLY CIRCULATING SUCH SIGNALS

[75] Inventors: Charles S. Lanier, Delray Beach; Hiram M. Maxwell; Roger E. McKay, both of Boca Raton; Leonard Weiss, Hollywood, all of Fla.

[73] Assignee: International Business Machines Corporation, Armonk, N.Y.

[21] Appl. No.: 362,414

[22] Filed: Mar. 26, 1982

[51] Int. Cl.³ .................................. G06F 15/16
[52] U.S. Cl. ............................... 364/200; 364/900
[58] Field of Search ........................ 364/200, 900

[56] References Cited

U.S. PATENT DOCUMENTS

| | | | |
|---|---|---|---|
| 4,007,450 | 2/1977 | Haibt et al. | 364/200 |
| 4,011,545 | 3/1977 | Nadir | 364/200 |
| 4,354,225 | 10/1982 | Frieder et al. | 364/200 |
| 4,354,226 | 10/1982 | Flickinger et al. | 364/200 |
| 4,354,229 | 10/1982 | Davis et al. | 364/200 |

Primary Examiner—Jerry Smith
Assistant Examiner—Jameson Lee
Attorney, Agent, or Firm—Robert Lieber

[57] ABSTRACT

A method of initializing non-synchronous peer-to-peer data communication rings, and for effecting error recovery in such networks. On detection of error, each station operates in a purging configuration to clear the ring. In the purging configuration the station's receiving circuits are isolated and its transmitting circuits transmit "clear" signals containing this station's own address as destination. These signals serve to purge all potentially erroneous information in all upstream stations which then are operationally connected to that station. If a loss condition is persistent the station operates first in a "bypass" configuration for a third predetermined time interval, then in the purging configuration for the second time interval, and then resumes normal operation. In the bypass configuration the station's ring input is connected directly to its output and the (locally clocked) output of its transmitting circuits is connected to the input of its receiving circuits. This serves to restore reception clocking in temporary alignment with the local transmission clock source. When a station switches from purging mode to normal operation it resumes monitoring its reception synchronism. If is fails to develop synchronism it repeats the foregoing recovery procedure.

13 Claims, 9 Drawing Figures

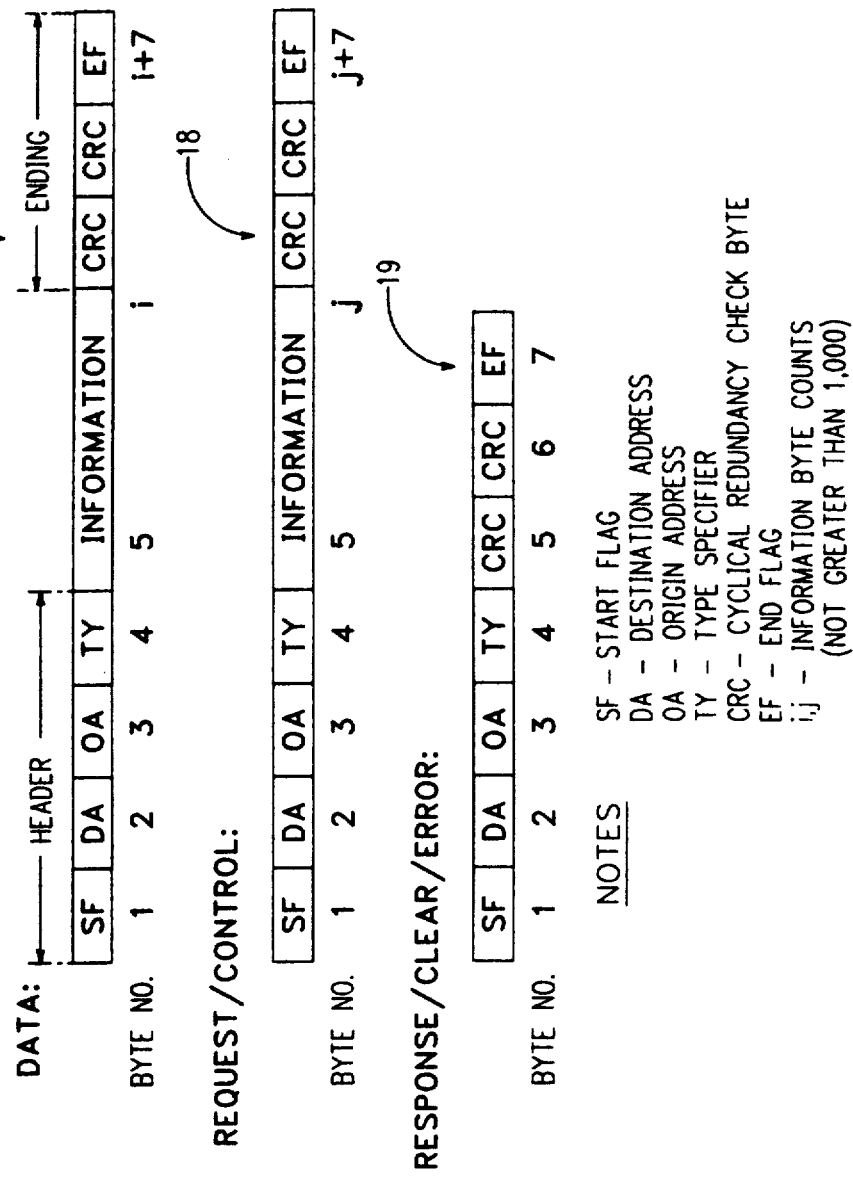

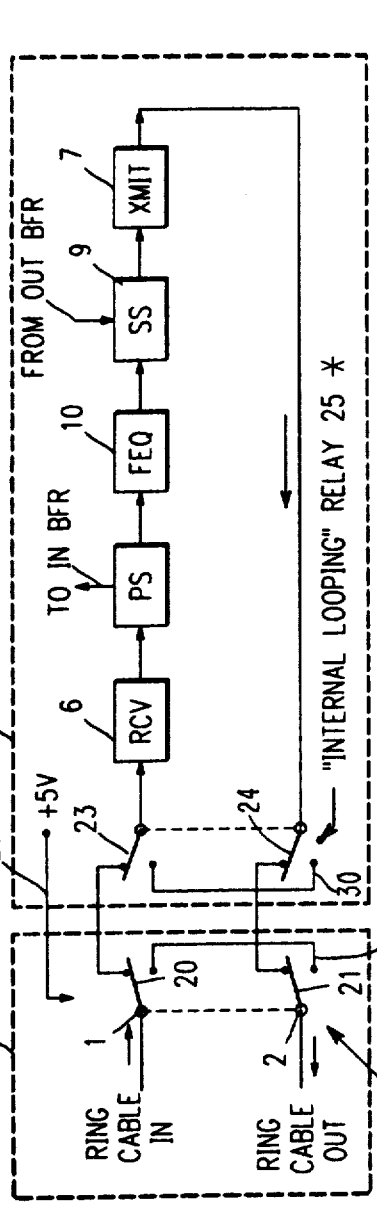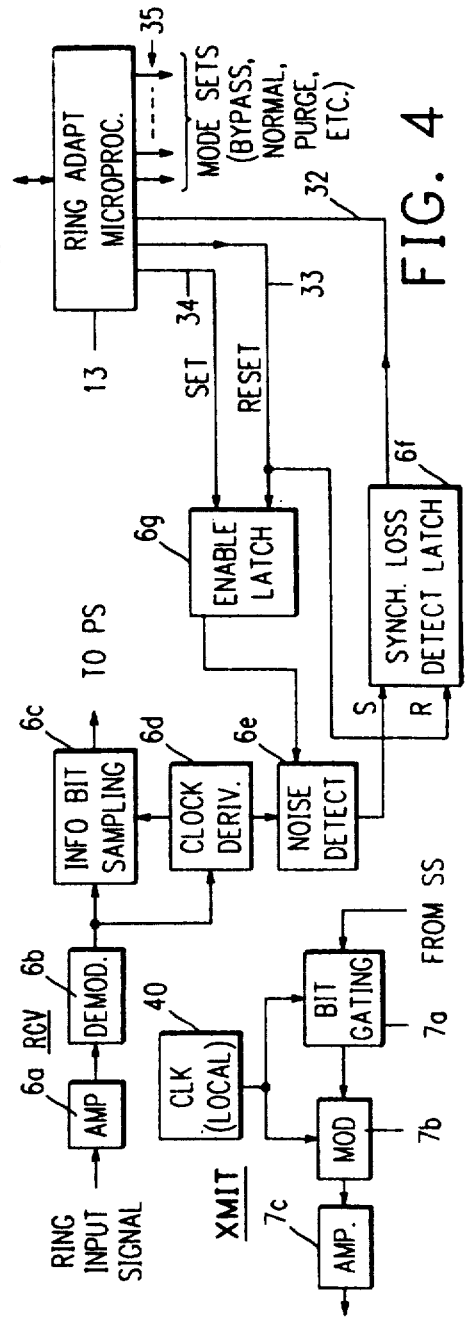

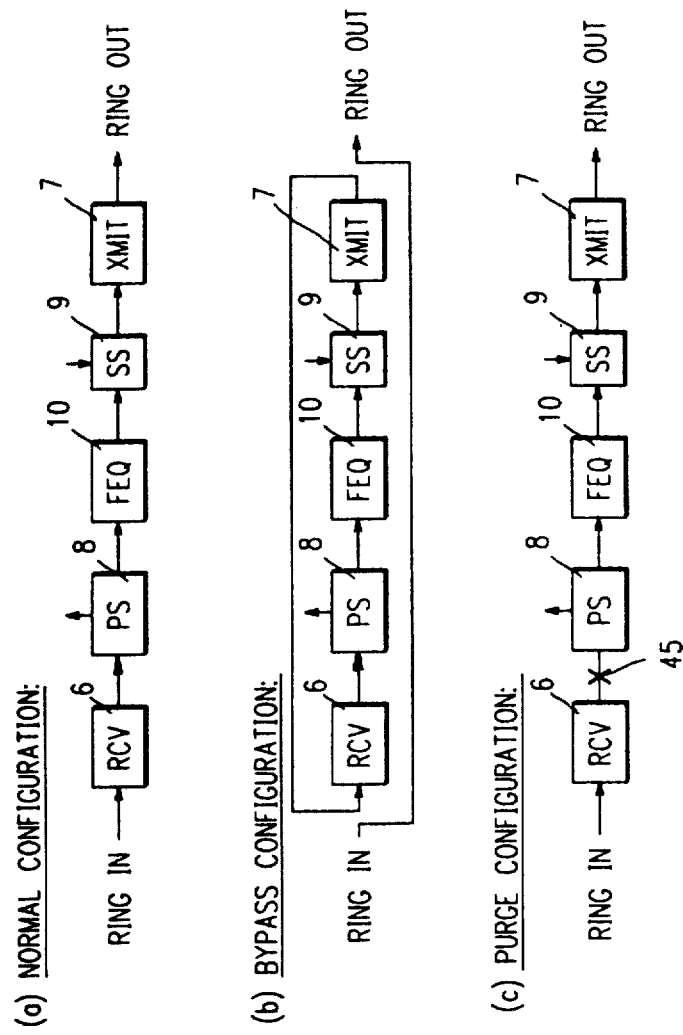

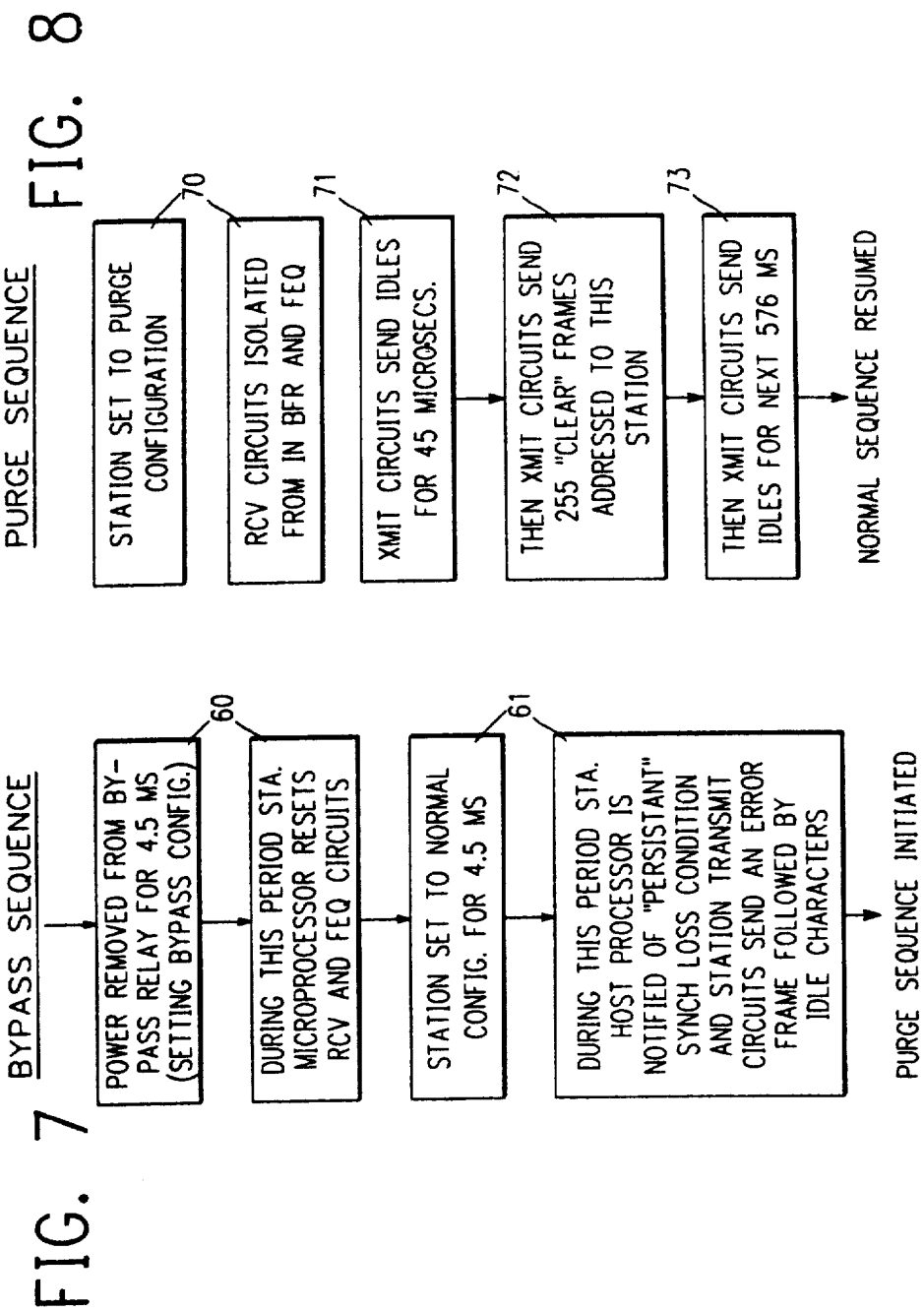

METHOD OF PURGING ERRONEOUS SIGNALS FROM CLOSED RING DATA COMMUNICATION NETWORKS CAPABLE OF REPEATEDLY CIRCULATING SUCH SIGNALS

Cross-References to Related Applications

Application Ser. No. 129,052 now U.S. Pat. No. 4,354,229 filed Mar. 10, 1980, by J. B. Davis et al., entitled "Loop Initialization Mechanism For A Peer-To-Peer Communication System", discloses a method of effecting initialization and error recovery in a peer-to-peer ring data communication system.

Application Ser. No. 342,439 filed Jan. 25, 1982, by C. S. Lanier et al., entitled "Distributed Data Processing In Ring-Structured Networks Architected For Full Duplex Peer-To-Peer Operation Of Processing Stations And Uninterruptible Transfer Of Long Data Records Between Stations", discloses I/O channel features of a nonsynchronous peer-to-peer ring communication system in which the presently disclosed initialization and error/timing recovery method may be beneficially employed. The disclosure of this application is incorporated herein by this reference.

Technical Field

This invention relates to methods and apparatus for initializing peer-to-peer data communication rings and for effecting error recovery in such rings, particularly in "non-synchronous" ring systems. As presently defined, a non-synchronous ring system is one in which each station derives its bit reception timing (clocking) dependently from signals sent by a preceding station on the ring and generates its transmission clocking reference independently from a source of locally generated oscillations which is not synchronized to the reception. A peer-to-peer system is one in which no supervisor or control station is provided.

Background Art

Ring-structured data communication systems presently known in the art are supervised by a central station or controller which governs initialization of the system and error recovery processes. However, such systems depend for their operation on the operability of the central station, and when the central station fails the system must undergo a complex reconfiguring procedure to install one of the other stations as the system controller.

Systems are also known which operate on a peer-to-peer basis without a central station. A representative one of these systems is disclosed in the above-referenced co-pending patent application to U.S. Pat. No. 4,354,229 J. B. Davis, et al. However, in these known systems initialization and recovery are predicated on the selection of a temporary master station and adaptation of timing in all other stations to a timing reference sent by this master station. This involves a selection process which can delay the initialization or recovery procedure and potentially interfere with productive operation of the system. Furthermore, the timing of station operations in such systems is critically dependent on the master reference.

The present invention eliminates any need for master station selection and timing dependencies characteristic of prior art systems. Initialization and recovery are fully automated and can be instigated independently by any station.

Summary of the Invention

The system to be described herein is non-synchronous, meaning presently that each station derives reception clocking synchronism from signals forwarded by the preceding station and transmission clocking synchronism from a respective local crystal oscillator which is not synchronized to the received signals (although the transmission reference oscillators in all stations are required to have the same frequency to within a defined tolerance).

When continuity and signalling stability exist in the present system, information circulates unidirectionally around the ring in variable length informational frames (containing from 7 to 1,007 bytes) interleaved with fixed length (7 byte) response/acknowledgment frames. Each frame contains origin and destination station address information. Receiving circuits at each station selectively steer incoming frames having a local destination to associated host data processing equipment, through an input buffer, and frames having remote destinations to respective transmission circuits and ring output ports through an insertion buffer herein termed the front end queue (FEQ). Received frames indicating the respective station's address as origin are usually discarded (i.e. not stored in either the input buffer or FEQ buffer). Received informational frames originated remotely and indicating the respective station's address as destination are acknowledged by response frames which are prepared by the receiving circuits.

Locally originated informational and response frames are applied to the station's transmission circuits through an output buffer. The input buffer, output buffer and FEQ are operated in a first-in-first-out (FIFO) mode.

Station receiving circuits derive reception bit clocking from received signals. Station transmission circuits derive transmission bit clocking independently from a local crystal oscillator.

Information is passed to the transmission circuits from either the FEQ or the output buffer. The ouput buffer is selected as the source only if the FEQ is empty, meaning presently that it contains fewer than four bytes. When not transmitting informational frames or response frames the station transmits idle bytes/characters which are used only to maintain synchronism in the receiving circuits of the next (operational) downstream station and are not stored in that station's input buffer or FEQ.

Each of the present stations contains a bypass relay which has normal and bypass contact positions. In the bypass position this relay connects the station's ring input port directly to its ring output port, and the output of the station's transmitting circuits directly to the input of its receiving circuits. In the normal position this relay connects the receiving circuits, FEQ and transmitting circuits in series between the ring input and output ports. In the bypass position the station derives reception clocking synchronism from its own local transmission oscillator. This is useful to restore synchronism when received signals are incoherent (i.e. lack clocking information).

Each of the present stations also contains circuitry for inducing a purging configuration in which the station's receiving and transmitting circuits are connected respectively to the ring input and output ports but the receiving circuits are isolated from the input and FEQ buffers. When set to this configuration the station operates for a predetermined interval of time to transmit a sequence of idle signals and clearing/purging frames to its output port. These frames have the effect of purging FEQ's in all downstream stations having operative connections to the transmitting station of any information inserted therein prior to the purging transmission.

In the normal configuration (receiving circuits, FEQ, and transmitting circuits in series between input and output ports) station receiving circuits continuously monitor for a loss of reception clocking. Upon detecting a loss, station circuits time out for a predetermined first interval of time during which the station continues to operate in the normal configuration. After this time-out the reception clocking condition is re-sampled. If clocking has been recovered the lost clocking condition is perceived as "transient". In this case the station transfers to the above-mentioned purging configuration, conducts the predetermined purging transmission sequence, and then resumes operation in the normal configuration. If the lost clock condition is re-encountered on the resampling it is perceived as "persistent". In that case the station transfers first to the bypass configuration for a predetermined time interval then to the purging configuration (and transmission sequence), and finally resumes operation in normal mode. The purging transmission following a bypass operation is preceded by an error frame which indicates a persistent error condition to all operatively connected downstream stations. The origin information in this frame—i.e. the address of the transmitting station—effectively indicates the location of any hard fault (ring short or open) potentially responsible for the associated condition as immediately upstream of the originating station.

The foregoing bypass and purging actions occur also during initial powering on of any station. However, in this case the purging transmission is preceded by a response frame directed to the respective station. If the response frame does not return the station's receiving circuits set a status indication of "lost ring continuity" which is communicated to the software of the associated host processor.

The duration of the time-out part of the recovery sequence is sufficient to allow for settling of contacts in any bypass relay upstream of the station performing the recovery operation, so that ring errors caused by "chattering" of these contacts are perceived only as transient conditions downstream, and do not cause operations of bypass relays in successive stations with "rippling" effect.

The duration of the purging operation exceeds the time which would be required for a purging transmission to circle a continuous ring having a "maximal" distance between stations and a "maximal" population of stations, assuming worst case delays in passage of such transmission through the reception circuits, FEQ, and transmission circuits in each station.

As stations are inserted into the ring by the subject initializing method any ring error conditions due to operations of their bypass relay contacts are perceived downstream only as transient "conditions". Therefore, stations may be induced to perform recovery sequences but they do not operate their bypass relays in such sequences and, therefore, they do not delay establishment of ring continuity. When all stations on the ring are operating either in purging or normal configurations the ring is effectively continuous for the purpose of completing the purging operation, and therefore will be able to sustain normal full duplex operations thereafter within the duration of one additional purging operation.

Accordingly, as stations are randomly powered up and inserted into the ring (in surging mode) transients due to operations of their relay contacts induce only short recovery sequences in downstream stations (timeout immediately followed by purging sequence). When there are no hard faults in the ring these actions culminate rapidly and automatically in establishment of ring continuity and stabilization of all stations in normal operating modes.

For a more complete understanding of the invention and a comprehension of other advantages and features thereof, reference should be made to the following description taken in connection with the accompanying drawings, and to the appended claims which indicate the scope of the invention.

Detailed Description of the Drawings

FIG. 1 schematically illustrates an environmental peer-to-peer ring network in which the present invention may be beneficially applied.

FIG. 2 illustrates various frame formats employed in the ring structure of FIG. 1.

FIG. 3 is a block diagram of station apparatus and contacts of a bypass relay used presently for initialization and "lost synch" recovery.

FIG. 4 is a block diagram of station circuits for instigating initialized and/or recovery procedures.

FIG. 5 illustrates station operating configurations variously associated with the present invention.

FIGS. 6-8 illustrate the recovery method of the present invention.

Detailed Description

Figure 1:
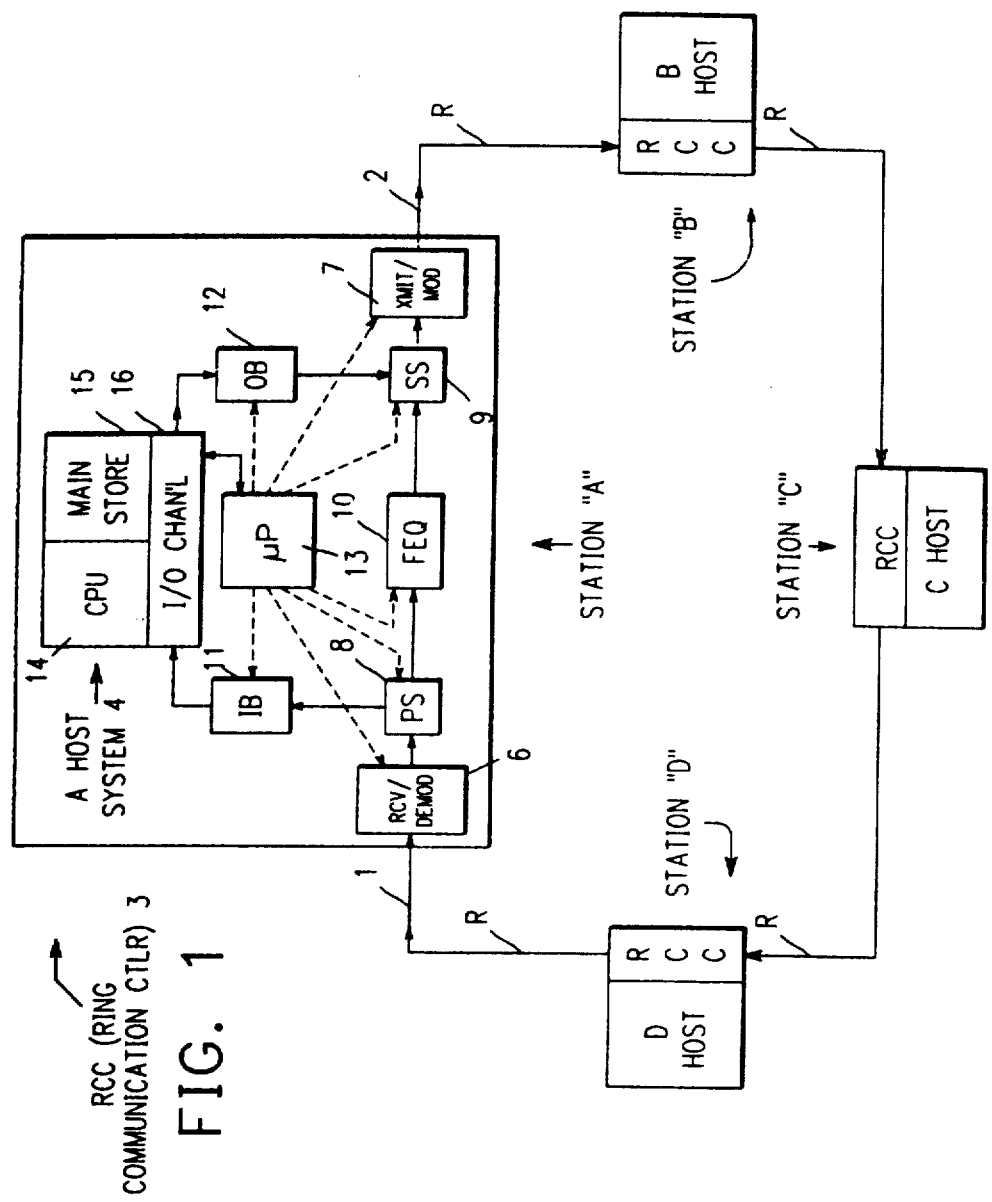

Introduction:

FIG. 1 illustrates a peer-to-peer ring-structured data communication network environment in which the present invention may be beneficially applied. For the sake of simplicity, only four stations (a, b, c and d) are illustrated. However, it will be understood that a much larger number of stations could be accommodated (with bit transmission timing, recovery timing and maximal unamplified propagation distance parameters specifically described herein, a system of up to 110 stations could be initialized or purged by operation of the present invention.)

The stations are serially interconnected in a ring, via ring line sectors R, in the direction indicated by the arrows (station A transmits to station B, station B to station C, station C to station D, and station D to station A). Each station comprises a ring communications controller (RCC), which interfaces between ring input and output ports, and host data processing equipment which communicates via the respective RCC and processes information.

As presently contemplated, the stations may have identical RCC and host equipment. The composition of a typical station (exclusive of the configuration switching equipment required for implementing the present invention) is illustrated for station A. As shown therein, each station comprises an input port 1, and output port 2, RCC equipment 3 and host equipment 4.

The RCC equipment comprises receiving-/demodulating circuits 6 interfacing with input port 1, transmission/modulating circuits 7 interfacing with output port 2, path selection/steering circuits 8 connected to the output of receiving circuits 6, source signal selection circuits 9 connected to the input of transmitting circuits 7, a front end queue (FEQ) insertion buffer 10 connected between an output of circuits 8 and an input of circuits 9, an input buffer 11 connected to an output of circuits 8, an output buffer 12 connected to an input of circuits 9, and a microprocessor or equivalent sequence control apparatus 13 for evoking various modes of operation of the RCC as described herein. Operations of the microprocessor which may be pertinent to the initialization and recovery operations of the present invention are described below.

The host system 4 comprises a CPU 14, a main store 15 and one or more I/O channels 16. The channels 16 have "subchannel" connections to an output of input buffer 11 and an input of output buffer 12.

In normal operation of the illustrated representative station (in this case station A) circuits 6 receive and demodulate signals sent to input port 1 from the preceding station (in this case, station D), demodulate the signals, derive bit reception clocking from the demodulated signals, sample bit information in the demodulated signals using derived clock signals, and transfer the sampled bits to path selection circuits 8. Circuits 8 examine origin and destination information contained in sampled bit frames and selectively pass bit frames having downstream destinations to FEQ buffer 10 and frames having local destinations to input buffer 11. Certain bit signals (idle bytes) are not transferred to circuits 8 and certain locally originated frames received by circuits 8 are not passed to either buffer. Such signals and frames are thereby removed from the ring. Circuits 9, timed by a source of locally generated clock signals not shown in FIG. 1, select bit frames from FEQ buffer 10 and output buffer 12 (from buffer 12 only if buffer 12 is not empty and buffer 10 is empty) and pass the selected frames to transmission/modulating circuits 7 which forward corresponding modulated signals to the ring via output port 2.

Information stored in input buffer 11 is passed through host I/O channel 16 to host main store 15 for processing by host CPU 14. Information is also transferred to output buffer 12 from main store 15 via channel 16. Certain outgoing frames (response frames) are developed by circuits 8, in association with reception of remotely originated informational frames in input buffer 11, and transferred directly to buffer 12 from circuits 8.

The format of information transmitted by the stations is indicated in FIG. 2. All information is sent in frames containing at least 7 bytes and not more than 1,007 bytes. Three general types of frames are shown: data frames 17, request/control frames 18, and response/clear/error indicating frames 19. All three types of frames have identical header and ending portions. The header of each frame consists of a 4-byte sequence including a start flag byte (SF), a destination address byte (DA), an origin address byte (OA), and a type specifying byte (TY). The ending portion of each frame consists of two cyclic redundancy check bytes CRC followed by an end flag byte (EF).

Data frames 17 contain a variable number of information bytes (1,000 or less bytes) between the TY byte of the header and the first CRC byte of the ending which constitute all or part of a discrete data message. Request/control frames 18 similarly contain up to 1,000 information bytes, between the TY portion of the header and the first CRC byte of the ending, representing a request or control message. Each incoming data or request/control frame 17 or 18 having a local destination must be specifically acknowledged by a response frame 19 sent to the origin station before another data or request frame can be sent from the same origin station to the same local station as part of one or more discrete message communications.

The overall operation is identical to the system operation described in the above-referenced co-pending patent application by Lanier et al., Ser. No. 342,439.

Referring to FIG. 1, when a station's FEQ is not empty (meaning presently that it contains 5 or more bytes) the contents of the FEQ are passed directly through the circuits 9 to the transmitting circuits 7 in a first-in-first-out (FIFO) mode. When the station's FEQ is empty (meaning presently that it contains 0 bytes), and its output buffer is not empty the contents of the output buffer 12 are sent to transmitting circuit 7 in FIFO mode. When both the FEQ and output buffer are empty the station transmitting circuits are conditioned to send locally timed idle characters. Transmitted idle characters—which are distinguishable from frame information in that idle characters are not preceded by a start flag function SF and are not followed by an end flag function EF—enable the next downstream station to sustain reception clocking but are not stored by the next station. Consequently, they do not interfere with the next station's access to the ring for transmitting information locally originated at that station.

Station Configuration For Initialization/Error Recovery

FIGS. 3–5 indicate how stations, in a ring structure of the type shown in FIG. 1, can be configured and operated in accordance with the present invention to carry out initialization and error recovery operations. As shown in FIG. 3, movable contacts 20 and 21 of bypass relay 22 connect respectively to input port 1 and output port 2 of the respective station. Movable contacts 23 and 24 of "internal looping" relay 25 connect respectively with the input of receiving circuits 6 and the output of transmitting circuits 7. As shown at 26, power for operating bypass relay 22 is supplied from a main card 27 containing the station RCC equipment to a paddle card 28 containing the bypass relay.

In the normal operating positions illustrated in FIG. 3, the movable contacts of relays 22 and 25 provide a serial connection from the ring input port 1 to the input of receiving circuits 6 and a serial connection from the transmitting circuits to the ring output port 2 of the respective station. This position, illustrated in FIG. 5(a), is assumed only after the station has been powered up and the paddle card has been plugged in to the main card. As will be explained later, during the powering up sequence the bypass relay assumes the indicated normal position only after completion of a checkout procedure.

When power is removed from relay 22 its movable contacts fall to the lower contact position in which they engage conductive segment 29 to form a direct shunt connection between the ring input and output ports 1 and 2. When power is removed from internal looping relay 25 its movable contacts drop into engagement with conductive segment 30, thereby forming a feedback connection from the output of transmitting circuits 7 to the input of receiving circuits 6. This permits idle signals generated by circuits 7 in synchronism with locally developed clock signals provided by source 40 (FIG. 4) to be applied to receiving circuits 6 for temporarily sustaining reception clocking derivation in the latter circuits.

Accordingly, when power is removed from relays 22 and 25 the station's ring input and output ports are directly connected and the station's transmitting and receiving circuits are internally connected as shown in FIG. 5(b). This configuration is termed the bypass configuration. Since it may not be cost effective to provide repeaters between stations in this type of system it is important that consecutive stations lacking repeaters not be spaced at greater than a predetermined maximum distance (e.g. 5,000 feet for twinaxial coax) at which the signal degradation due to normal attenuation would prevent intelligible reception (i.e. would not permit coherent reception clocking derivation and bit sampling).

Referring to FIG. 4, receiving apparatus in accordance with the present invention comprises input amplifying circuit 6a, demodulating circuit 6b, information bit sampling circuit 6c, reception clock deriving circuit 6d, noise detecting circuit 6e, synch loss detection latch 6f and enabling latch 6g. Ring signals received and amplified by circuits 6a are demodulated by circuits 6b and applied to sampling circuits 6c and clock deriving circuits 6d. In the absence of reception noise or an upstream "hard fault", circuit 6d develops valid clocking signals which control bit gating operations at circuit 6c. The output of the clock deriving circuits 6d is monitored by noise detecting circuits 6e when the latter circuits are enabled by set conditioning of enable latch 6g.

During operations in the normal configuration (FIG. 5a), if clocking is not validly generated for a predetermined period of time (in the present embodiment 2 microseconds, representing an interval spanning 4 consecutive bit transmissions on the ring) circuits 6e are enabled by latch 6g and produce an output which sets latch 6f. When set, latch 6f activates line 32 which is monitored (as an attention interruption line) by microprocessor 13. When the microprocessor senses an active condition on line 32 it produces a signal on line 34 which resets latches 6f and 6g and begins a 4.5 millisecond time-out. At the end of the time-out latch 6g is set enabling circuits 6e to re-sample the operating condition of clock deriving circuits 6d. If circuits 6d are not developing valid bit clocking signals when re-sampled, the condition originally sensed is tagged as persistent. If circuits 6 are operating properly when sampled the condition originally sensed is tagged as transient.

If the re-sampled condition is persistent latch 6b is set causing line 32 to go active for a second time indicating a persistent condition to microprocessor 13. If the re-sampled condition is transient latch 6f will not be set allowing line 32 to remain inactive as a corresponding indication of a non-persistent condition to the microprocessor.

When it re-samples line 32 microprocessor 13 determines that the originally sensed condition is either transient (line 32 not active) or persistent (line 32 active) and activates one of its configuration setting lines 35 to 60 establish either a purging configuration or a bypass configuration (purging if the sensed condition is transient, bypass if it is persistent).

In the purging configuration (FIG. 5c) bypass relay 22 (FIG. 3) remains in its normal operating position but the output of receiving circuits 6 is isolated from the input of circuits 8 as suggested at 45 (FIG. 5c) preventing further loading of buffers 10 and 11 (FIG. 1). In the bypass configuration (FIG. 5b) power is removed from the relays 22 and 25 causing their contacts to drop to their inactive positions (lower positions in FIG. 3) whereby the input port is connected directly to the output port and the output of the transmitting circuits 7 has a feedback connection to the input of the receiving circuits 6 in the respective station.

As shown in FIG. 4, local clock source 40 supplies bit gating (clock) signals to gating circuits 7a and modulating circuits 7b in transmitting circuits 7 for independently timing bit transmissions from the respective station's buffer 10 and 12 to the ring.

Error Recovery Method

The error recovery method characteristic of the present invention will now be described with reference to FIGS. 6-8. The use of the configuring apparatus indicated above for initializing the network will be described later with reference to FIG. 9.

When a station is operating in the normal configuration (FIG. 5a) information reaching steering circuits 8 and having a downstream destination or an "all stations" (broadcast) destination is loaded into FEQ 10. Information in FEQ 10 and in the station's output buffer 12 is selectively combined and passed bit serially through transmitting circuits 7 to the ring output port 2. As shown at 50 in FIG. 6, during such operations circuit 6e-6f continuously monitor the state of clock deriving circuits 6d (FIG. 4). If a lost clock condition is detected, latch 6f is set activating line 32 (FIG. 4). As shown at 51 in FIG. 6 the station microprocessor (or equivalent control circuits) react to the setting of latch 6f by evoking a recovery sequence described at 52-54 and immediately reset the latch.

The recovery sequence begins with a time-out operation which is conducted while the station remains in its normal configuration (FIG. 5a). As shown at 52, this time-out spans a predetermined time (15 milliseconds in the present embodiment) which is sufficient to permit stabilization of any upstream bypass relay which may have been in a transient contacting condition when latch 6f was set. As shown at 53, at the end of this time-out period the microprocessor sets latch 6g permitting re-sampling of the condition of clock deriving circuits 6d. The resulting state of line 32 conditions the microprocessor to reconfigure the station either to its purge configuration (FIG. 5c) for conducting a purge sequence, shown at 54 in FIG. 6 and detailed in FIG. 8, or to its bypass configuration (FIG. 5b) for conducting both the bypass sequence 55 (detailed in FIG. 7) and the purge sequence 54. The choice depends upon the persistence or non-persistence of the originally sensed condition when line 32 is re-sampled. If the condition is transient sequence 54 is chosen and if the condition is persistent sequence 55 followed by sequence 54 is chosen.

The purging sequence 54 and bypass sequence 55 span predetermined intervals of time (583.2 and 9.0 milliseconds respectively) chosen presently to allow for serial purging of FEQ's in a maximally populated ring (110 stations with present signalling and storage parameters). At the end of the purging sequence the microprocessor conditions the circuits to resume the normal configuration and normal operating sequence as suggested at 56. If the clock loss condition exists when normal operation resumes the station immediately repeats the recovery sequence 50-52.

Referring to FIG. 7 the bypass sequence has a duration of 9.0 milliseconds which is timed-out by the microprocessor from the time that it energizes its bypass mode selection line 35 to remove power from the relays 22 and 25. As indicated at 60 in FIG. 7 during the first half of this period the station relays are in the bypass configuration (FIG. 5b) and the microprocessor resets at least circuits 6 and FEQ buffer 10 in the station's RCC. At the same time the transmitting circuits 7 feed idle bytes timed by the local bit clock source 40 to receiving circuits 6, causing the circuits 6 to derive bit clocking signals temporarily synchronized with clocking signals produced by local clock 40.

As shown at 61 in FIG. 7, during the second half of the bypass sequence the station is restored to its normal configuration (FIG. 5a), and while in this configuration the station transmitting circuits send an error frame which contains a broadcast (all stations) destination byte followed by idle characters. At the same time the station microprocessor operates to interrupt the host processor (4, FIG. 1) and provides status information informing the host processor of a "persistent" synch loss condition encountered by the receiving circuits of the respective station. This primes the software of the respective station to issue local origin messages—for movement through store 15, channels 16, output buffer 12 and respective transmitting circuits 9 and 7—for informing downstream stations of a potential hard fault condition (open or short) locatable upstream of the respective station.

At the conclusion of this second half of the bypass sequence the microprocessor activates an appropriate one of the lines 35 (FIG. 4) to induce the purging configuration (FIG. 5c), which is the same as the normal configuration except that circuits 6 are isolated from circuits 8 preventing operation of FEQ 10. The setting of this configuration and the state of isolation of the receive circuits 6 is indicated at 70 in FIG. 8. This configuration is retained for the predetermined interval of time (approximately 583.2 milliseconds) indicated collectively in boxes 71–73 of FIG. 7.

In the first 45 microseconds of this interval the station sends idle characters (11 idle characters) as suggested at 71. In the next 7.140 milliseconds the station sends 255 clear frames, each 7 bytes in length and each addressed to this station, as shown at 72. Then for the remaining 576 milliseconds the station sends idle characters, as shown at 73. At the conclusion of the purging sequence the microprocessor activates one of the lines 35 (FIG. 4) to restore the station to its normal configuration, and the station then resumes its normal operating sequence as an in-line element of the ring network.

Start Up Sequence

Figure 6:
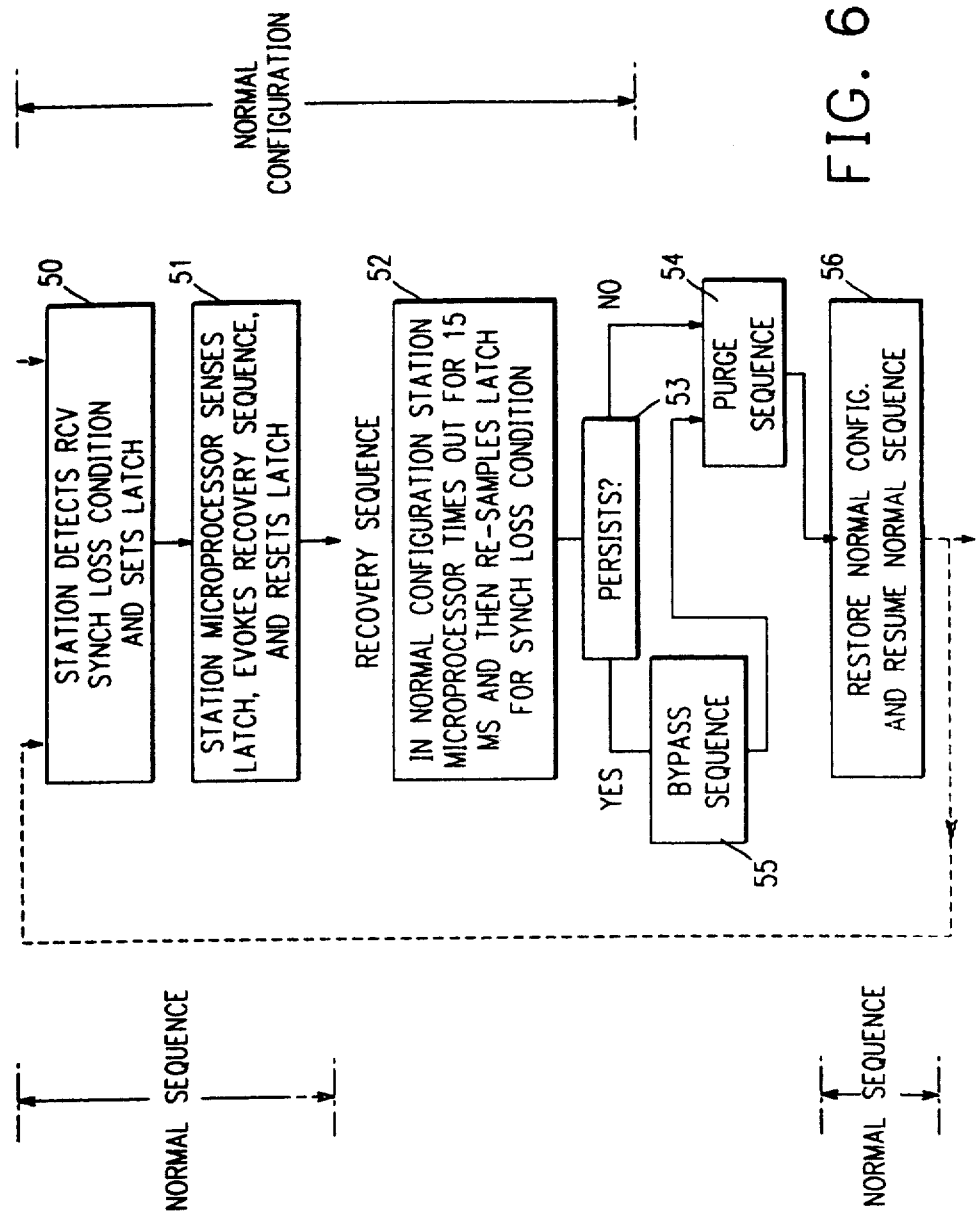
Figure 9:
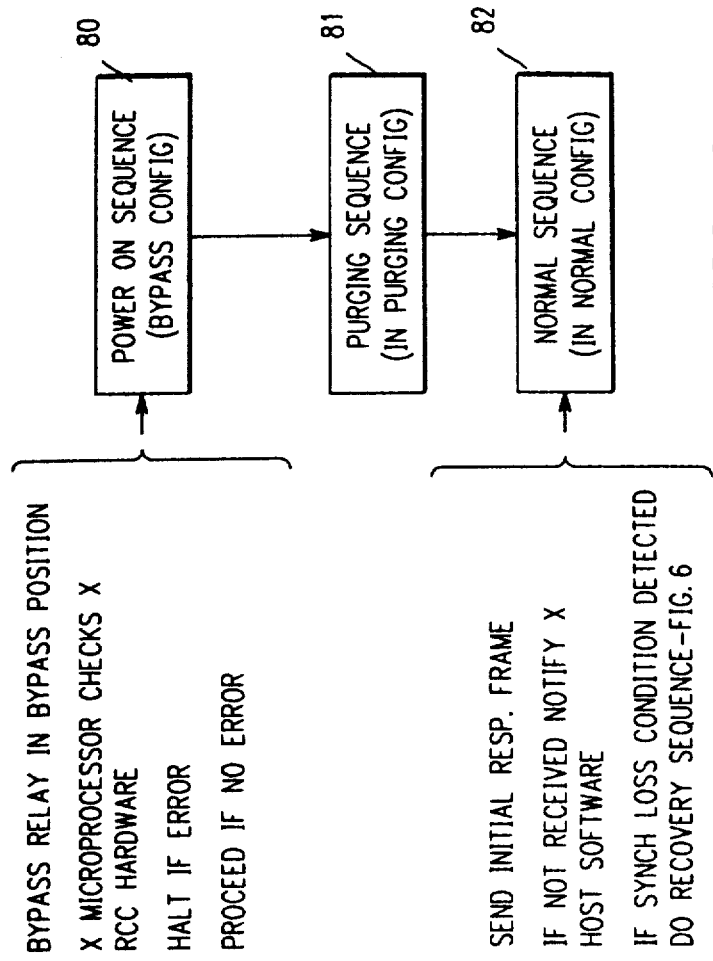
FIG. 9 illustrates the method of system initialization in accordance with the present invention.

Referring to FIG. 9, the start-up procedure at each station (powering on procedure) differs only slightly from the recovery procedure of FIGS. 6–8. Before power is applied to the station bypass relay 22 is in the bypass position (FIG. 5a), providing a continuous shunt path directly from the station's ring input port to its output port.

When the station main card is powered on, the station microprocessor conducts power on sequence 80, while withholding power from relays 22 and 25. This leaves the station in the bypass configuration (FIG. 5b) while the microprocessor checks out the condition of the RCC circuits (through diagnostic procedures which are not directly relevant to the present invention). If the RCC circuits are operating incorrectly, operating personnel are alerted to effect necessary repairs.

If the station RCC hardware is operating correctly, the power on sequence 80 concludes with the station switching to its purging configuration (FIG. 5c) for conducting a purging sequence identical to purging sequence 54 (FIGS. 6, 8).

At the end of the purging sequence the station is set to its normal configuration (FIG. 5a) and begins operating in its normal mode. However, the first frame sent out in this mode is a locally generated response frame which is addressed to the respective station as destination. Transmission of this frame is intended to test the continuity of the ring. If this frame is received it is placed in the station's in buffer 11 (FIG. 1). The microprocessor monitors the in buffer for this frame after a period of time sufficient to allow for passage of the frame through a maximal number of successive FEQ's with a maximal delay in each. If the frame is not received by the time the microprocessor informs the host processor (through an interruption) that ring continuity has not yet been achieved. This conditions host software to originate a control message for transmission via the ring (through the RCC of the respective station) to any downstream stations then having continuity to the respective station, for informing such downstream stations of the detected ring discontinuity condition.

Global View of Recovery and Initialization

We consider now the effect of the foregoing initialization and recovery operations at any station in a "global" context (i.e. in the context of the effect on other stations in the ring). Consider first the possibility that several stations are powered on concurrently. Each of these stations will autonomously conduct a power on sequence 80 followed by a purging sequence 81. As each station transfers from the power on (bypass) configuration to the purging configuration the associated transient operation of its relays may cause the next normally configured downstream station (if there is one) to lose reception clocking synchronism and perform a recovery sequence 52+ (FIG. 4).

If recovery sequences occur concurrently at more than one station the last station to recover will purge the FEQ's of all other stations. If two or more stations execute recovery sequences at exactly the same time they will simultaneously purge respective downstream sectors of the ring network.

In general, if no hard failures are encountered, the ring will stabilize with all stations normally configured after an extended purging period spanning the overlapping and aggregate initialization operations of the stations then being powered on and recovery operations of neighboring downstream stations.

Now assume that the ring is continuous, and all stations are operating normally, and that a transient timing error condition is generated, e.g. at station D, causing a loss of reception clocking synchronism at station A. This will cause station A to perform the "short" recovery sequence 52–54 (FIG. 6) and purge FEQ's in stations B, C and D. Furthermore, A's FEQ will purge itself during the time-out operation 52 since the condition is transient.

Next assume that a hard fault condition occurs between station D and station A (e.g. a break in the connecting ring line sector). In this case A performs the "long" recovery sequence 52, 53, 55, 54 (FIG. 6), detects persistent error when it resumes normal operation and repeats the recovery sequence. In each recovery sequence A notifies its host processor of a persistent error condition and, after several iterations of this, host software in A sets an alarm alerting maintenance personnel to fix the break. In each iteration of the recovery sequence the operation of the bypass relay at A may induce a transient error condition at B (transient because of the required time-out delay 52) and a purging operation (but not a bypass sequence) by B. Consequently the relay transient at A will not "ripple" around the ring.

The 4.5 millisecond time-out operation (52, FIG. 6) is long enough to allow for upstream relay contacts to stabilize before the error re-sampling action which distinguishes between persistent and transient synch loss conditions (and, therefore, governs selection of the long or short recovery sequence).

The duration of the purging sequence allows for the transmission of the 255 clear frames at a 2 MHz bit rate through a maximally populated ring (110 stations), with assumed maximal delays in the receiving circuits and FEQ of each station (1,008 byte times −4.032 milliseconds, per station) and assumed maximal propagation distances between stations (e.g. 2,000 feet average) plus a safety margin (at least 30 millisecs).

While there has been described what is at present considered to be a preferred embodiment of this invention, it will be obvious to those skilled in the art that various changes and modifications may be made therein without departing from the invention. It is, therefore, intended to cover all such changes and modifications in the following claims as falling within the true spirit and scope of the invention.

What is claimed is:

1. In a data communication network, including a plurality of data processing stations serially connected in a closed ring by a communication link which conducts information signals originated by said stations unidirectionally through stations successively positioned along said link for receipt by both the originating stations and other stations, said stations communicating on a peer-to-peer basis via said link and being respectively characterizable with respect to any selected station as positioned either upstream or downstream of the selected station depending on whether the direction of a given signal flow along said link is from the respective station to the selected station or from the selected station to the respective station, said stations normally operating relative to said link in a non-synchronous mode wherein each station derives timing references for receiving signals from the link from the respective signals and each station derives timing references for transferring signals to the link from a timing source within the respective station, a method of initializing said network comprising:

at any of said stations, detecting a condition relative to said network requiring initialization of the respective station;

on detecting said condition at a station, performing predetermined bypassing and purging operations in succession at the respective station;

the bypassing operation comprising initializing circuits within the station for operation relative to the link while blocking passage of signals from the link into the station and from the station to the link and also permitting signals to pass along said link so as to provide continuity in the link between stations positioned upstream and downstream of the respective station;

the purging operation comprising interrupting continuity of the link at the respective station, so that signals arriving from upstream station positions on the link are not transferrable to downstream station positions, while transferring predeterined purging signals from the respective station downstream on the link and also trasferring signals into the respective station from upstream station positions on the link; and maintaining said purging operation for at least a time sufficient to ensure that any transient noise signals, which may have been transferred from the respective station to the link at the transition from said bypassing operation to said purging operation, have been allowed to pass completely around said ring and be trapped at the respective station and thereby purged from the link.

2. In a data communication network, including a plurality of data processing stations having variable depth insertion buffers which are normally connected in a closed ring by a communication link which extends serially in one direction between the buffers in successive stations, said stations communicating on a peer-to-peer basis via said link and being respectively characterizable with respect to any selected station as being positioned either upstream or downstream of the selected station depending on whether the direction of a given signal flow on said link is from the respective station to the selected station or from the selected station to the respective station, said stations normally operating relative to said link in a non-synchronous mode wherein each station derives timing references for receiving sinals from the link from those signals and each station derives timing references for transferring signals to the link from timing sources within the respective station, a method of initializing said network comprising:

at any of said stations, detecting a condition relative to said network requiring initialization of the respective station;

performing predetermined bypassing and purging operations in succession at the station detecting said condition;

said bypassing operation having a first predetermined duration, and comprising isolating the circuits of the respective station, including its insertion buffer, from the link and forming a bypassing connection between adjacent link segments, allowing signals flowing along the link to completely bypass the respective station;

said purging operation having a second predetermined duration related to the maximum propagation delay around said ring, and comprising forming connections between the station, its insertion buffer and the link which permit the station to receive signals from upstream station positions in the ring and transfer internally originating signals to downstream station positions but prevents passage of signals between upstream and downstream positions;

said second duration being of sufficient length to ensure that any noise signals injected into the ring from the station, as a result of the transition from the bypassing operation to the purging operation, are trapped at the respective station after passing around the ring and prevented from continuing around the ring a second time;

at the conclusion of said purging operation, conditioning the respective station to connect its insertion buffer in series with the link for operating normally relative to the other stations.

3. In a data communication network, including a plurality of data processing stations having variable depth insertion buffers which are normally connected in a closed ring by a communication link which extends serially in one direction between the buffers in successive stations, said stations communicating on a peer-to-peer basis via said link and being respectively characterizable with respect to any selected station as being positioned either upstream or downstream of the selected station depending on whether the direction of a given signal flow on said link is from the respective station to the selected station or from the selected station to the respective station, said stations normally operating relative to said link in a non-synchronous mode wherein each station derives timing references for receiving signals from the link from the signals to be received and each station derives timing references for transferring signals to the link from timing sources within the respective station, a method of operating a station to recover from an error condition in said ring comprising:

detecting an error condition in signals passing into the respective station's insertion buffer from stations positioned upstream on said link while said station is connected in its normal operating position with its insertion buffer in series with the link;

determining if the error condition is transient or persistent;

interrupting operation in said normal mode if the error condition is persistent, and conducting a recovery operation comprising successive bypassing and purging operations, and thereafter resuming operations in said normal mode;

said bypassing operation having a first predetermined duration, and comprising connecting the insertion buffer of the respective station in an internal circuit loop, permitting the station to initialize the timing of the circuits which normally receive signals from the link, and connecting the link in shunt around the respective station so as to allow for uninterrupted passage of signals from stations upstream of the respective station to stations downstream of the respective station; and said purging operation having a second predetermined duration longer than said first duration and comprising:

connecting the respective station to the link for receiving signals from upstream stations and transmitting internally originating signals to downstream stations;

interrupting continuity of the link at its position of connection to the respective station so that signals arriving from upstream stations are unable to pass to downstream stations;

transferring predetermined purging signals from the station to the link for transfer downstream on the link; and maintaining such connections, continuity interruption and signal transferring operations for a time sufficient to ensure that any noise which may have been transferred downstream at the transition of the station from said bypassing operation to said purging operation will have passed through all downstream insertion buffers in its path and will have been trapped at the respective station on returning to that station from the upstream direction of the link, thereby ensuring that such noise will have been prevented from repeatedly circulating around the ring.

4. The recovery method of claim 3 further comprising:

on determining that an error condition is transient, performing said purging operation directly, without an intervening bypassing operation; thereby clearing the transient error condition from the ring without said bypassing operation.

5. The recovery method of claim 3 wherein said stations have predetermined addresses in said ring and information transferred through said link may include a destination term specifying the address of a station as a receiving destination, said method further comprising:

arranging the signals sent downstream in said purging operation to include as destination information the address of the respective station which originated the signals, whereby successive stations downstream of said respective station will automatically pass said signals further downstream unless said downstream stations receive said signals while themselves performing a purging operation.

6. The recovery method of claim 5 wherein:

the signals sent downstream in said purging operation include information specifying the address of said respective station as an origin of the purging signals, and information uniquely distinguishing those signals as a purging transmission, whereby stations downstream of the respective station are effectively informed that an error condition exists either at or upstream of the respective station.

7. The recovery method of claim 3 wherein each station operating in said normal mode derives bit reception clocking information from information bit signals arriving at the respective station in transit from stations positioned upstream of the respective station, and said error detecting and distinguishing steps comprise:

monitoring said bit reception clocking information for occurrences of conditions representing a timing error;

upon detecting such a condition, waiting a first predetermined time interval and repeating the monitoring operation;

if the condition is not found when the monitoring operation is repeated, distingishing the condition as transient and initiating a said purging operation directly, without an intervening bypassing operation, for clearing the transient condition from the ring;

if the condition recurs when the monitoring operation is repeated, distinguishing the condition as persistent and performing said bypassing and purging operations in succession.

8. The recovery method of claim 7 wherein:

said stations have relays for establishing the connections required for said bypassing and purging modes of operation, said relays operating when positively energized to form connections permitting the respective stations to operate either in said normal mode or said purging mode, said relays operating when de-energized—as when a loss of electrical power occurs—to form connections permitting the respective stations to perform said bypassing operations; and wherein said bypassing operation in any respective station comprises:

removing power from said relay in the respective station;

and providing power to at least the circuits within the respective station responsible for exchanging signals with said link for enabling said circuits to develop coarse synchronism for bit reception clocking from the internal timing source which normally provides the reference for timing downstream bit transfers from the respective station to the link.

9. The recovery method of claim 8 wherein the length of said first time interval is sufficient to allow for the relay in any upstream station to undergo a change in position and settle to a stable condition, and thereby sufficient to ensure that if the error condition is due to a transient caused by a changing upstream relay, it will have vanished by the time the monitoring operation is repeated.

10. In a data communication network, including a plurality of data processing stations having variable depth insertion buffers which are normally connected in a closed ring by a communication link which extends serially in one direction through the buffers in successive stations, said stations normally communicating on a peer-to-peer basis via said link and being respectively characterizable with respect to any selected station as being positioned either upstream or downstream of the selected station depending on whether the direction of a given signal flow on said link is from the respective station to the selected station or from the selected station to the respective station, said stations normally operating relative to said link in a non-synchronous mode wherein each station derives bit timing references for receiving data bit signals from the link from the respective bit signals to be received and each station derives timing references for transferring data bit signals to the link from a timing source within the respective station, said stations being selectively connectable to said link in normal, bypassing and purging configurations, said normal configuration permitting a respective station to carry out normal data communications with other stations through said ring, with its insertion buffer in series with said ring, and said bypassing and purging configurations permitting a respective station to conduct operations for recovering from error conditions in said network arising upstream of the respective station and for removing erroneous signals from said ring, said bypassing configuration providing a shunt connection between receiving and transmitting ports at each respective station permitting signals passing along said link from stations upstream of the respective station to circulate without interference to downstream stations, and said purging configuration establishing a discontinuity in said ring at the position of normal connection between the respective station and said link and providing connections at that position between the receiving and transmitting ports at the respective station and respective receiving and transmitting circuits of the respective station, a method of inserting a newly activated station into said network comprising:

keeping said newly activated station in said bypassing configuration while it is being powered on and for at least a sufficient time thereafter to allow its circuits to settle to a stable error-free condition; thereafter placing said station in said purging configuration for a predetermined time, and during that time conducting a purging operation in which the respective station transfers predetermined purging signals to its transmitting port, for transfer downstream on said link, while trapping and monitoring signals arriving at its receiving port; and thereafter placing said station in said normal configuration.

11. The insertion method of claim 10 wherein said bypassing and purging configurations are established by means of connection switching elements requiring a finite time to settle into stable conditions, and wherein said predetermined time duration for said purging operation at a respective station is of sufficient length to ensure that any noise signals which may have been injected into said ring at the transmitting port of a respective station, as a consequence of the switching to said purging configuration, have been able to pass through the insertion buffers of all succeeding stations and return and be trapped at the respective station.

12. The insertion method of claim 11 wherein said active elements are electromechanical relays having contacts for forming said connections at the respective station, and said predetermined time for said purging operation is sufficient to allow for settling of the respective relay contacts into the purging configuration as well as to allow for propagation around the ring of any spurious signals associated with the settling.

13. The method of claim 12 wherein said link comprises lengths of electrically conductive cable having a finite delay characteristic, and the predetermined time for said purging operation is made sufficiently long to allow for both settling of said relay contacts and propagation of any spurious signals associated with said settling through a maximum number of insertion buffers and a maximum aggregate length of cable, said maximum number being at least as great as the maximum number of stations which can be accommodated in said ring and said maximum cable length being at least as large as the product of said maximum number and the maximum length of cable which can be extended between successive stations without causing undue degradation of signals passing between said stations due to attenuation.

* * * * *